INVENTOR

Heinz Lindner

United States Patent Office 3,434,736
Patented Mar. 25, 1969

3,434,736
COUPLER FOR TRACTOR TRAILER
Heinz Lindner, Sprendlingen, Germany, assignor to Firma Jost-Werke G.m.b.H., Neu-Isenburg, Germany, a company
Filed June 22, 1967, Ser. No. 672,944
Claims priority, application Germany, June 25, 1966, St 25,584
Int. Cl. B62d *53/06;* B60d *1/00*
U.S. Cl. 280—435                    12 Claims

ABSTRACT OF THE DISCLOSURE

A coupling arrangement for connecting a tractor to a trailer. The tractor has a lower fifth wheel plate with an outwardly flared slot for receiving the kingpin of the semi-trailer upper fifth wheel plate. Two concentrically located claws, one of which is pivotably disposed, are positioned underneath the rear end of the slot and adapted to receive the kingpin. A self-adjusting wedge and locking arrangement is interposed between the claws for locking the claws and the kingpin into engagement position.

---

The invention relates generally to an improvement in tractor-trailer fifth wheel couplings, and more particularly, to the mechanism for adjustably locking the kingpin.

In the prior art of safety couplings of this type, it is known to utilize a claw, or the like, for engaging the kingpin and a locking arrangement, such as a wedge, to hold the claw in place. In such cases however, the wedge faces the suitably curved claw in a direction opposite to the direction of normal tractor-trailer travel. This makes coupling difficult and complicates the task of automatically adjusting the position of these parts and causes appreciable and rapid wear of the contact surfaces, so that it becomes necessary to frequently replace these components.

The device in accordance with this invention overcomes these disadvantages of prior construction by arranging the locking member and more particularly the wedge thereof and the curved claw in a direction opposite to the direction of travel and, consequently, the curved front claw is not affected, in any appreciable way, by the pull exerted by the tractor upon the back claw mentioned in the preceding paragraph. Essentially, the front claw is only placed in a loaded position upon occasional braking by the tractor causing the kingpin to impact against the front claw.

As a result of the foregoing, automatic adjustment between the wedge and the front claw takes place continuously with only a minimum amount of friction between these parts and thus the necessity for frequently replacing the locking mechanism is eliminated.

Another advantage of the device in accordance with this invention resides in the fact that the inside end face of the slot of the lower fifth wheel plate is no longer subject to the wear and tear of the kingpin which would ordinarily abut thereagainst upon braking of the tractor and, consequently, the work life of the lower fifth wheel plate is now substantially the same as that of the tractor as a whole. In the improved device the braking impact upon the kingpin is absorbed by the front claw and it is no longer necessary to reinforce the end face of the slot.

One aspect of the present invention resides in the coupling arrangement for a tractor-trailer in which a lower fifth wheel plate is provided with a slot for receiving a kingpin therein. A housing depends from the bottom of the plate and is located at least partly underneath the slot. A pair of claws is suitably mounted within the housing and is rotatably movable therein and arranged for receiving the kingpin between the claws in a manner so that the first claw is located forward and the second claw rearward of the kingpin in the normal direction of travel. A self-adjusting locking mechanism is interposed between the curved surface of the first claw and the second claw. This mechanism includes a wedge which has a tapered face in engagement with the curved surface of the first claw.

It is therefore the primary object of this invention to provide an improved fifth wheel coupling which substantially reduces friction between the various cooperating parts thereby appreciably extending the work life of the device.

It is a further object of this invention to arrange the members composing the fifth wheel coupling in such a manner so that they are readily accessible for exchange or service.

It is a further object of this invention to provide a coupling of the type as above described in which a resilient retarding force acts against the movable claw to prevent accidental decoupling, for instance as the result of sudden movements due to bad terrain, while still permitting the kingpin to maneuver within a given space.

It is a still further object of this invention to provide a device of the type described in which the locking mechanism is effective to automatically compensate and adjust for movements within the coupling thereby eliminating extreme tolerances or play between the cooperating elements.

For a better understanding of the present invention, together with other and further objects thereof, reference is had to the following description taken in connection with the accompanying drawings, and their scope will be pointed out in the appended claims.

Figure 3:
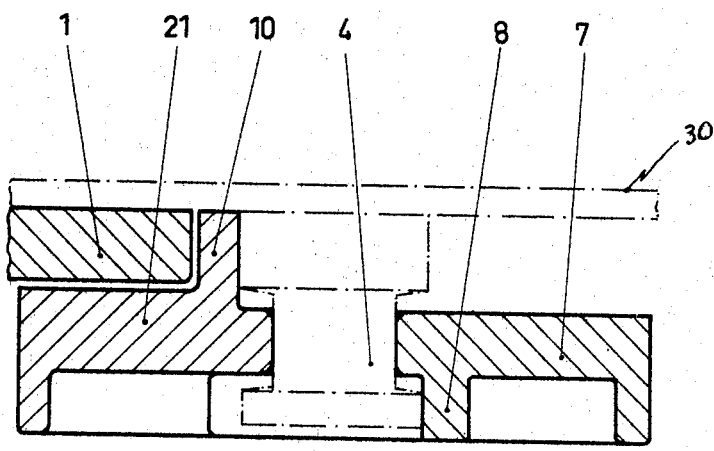
FIGURE 3 is an enlarged cross-sectional view taken along line 3—3 of the coupling shown in FIGURE 2.

Referring now to the drawings, there is shown a lower fifth wheel plate 1 of substantially conventional configuration adapted to mate with the upper fifth wheel plate, only partly shown, see 30, FIGURE 3. The plate 1 is mounted at an incline to the tractor (not shown) on two support brackets 2 located at opposite ends of the plate and is formed with an outwardly flaring slot which is adapted to receive the kingpin 4, suspended from the upper plate of the fifth wheel, and to guide the pin 4 into the extreme central position when the tractor is moved into coupling position with the trailer.

A detachably secured tubular housing 18 depends from the bottom of the lower plate 1 surrounding portions of the central sector of slot 3. The housing 18 has an axially extending opening which is commensurate with the transverse dimension of the slot 3 proximate to the forward section thereof.

Figure 2:
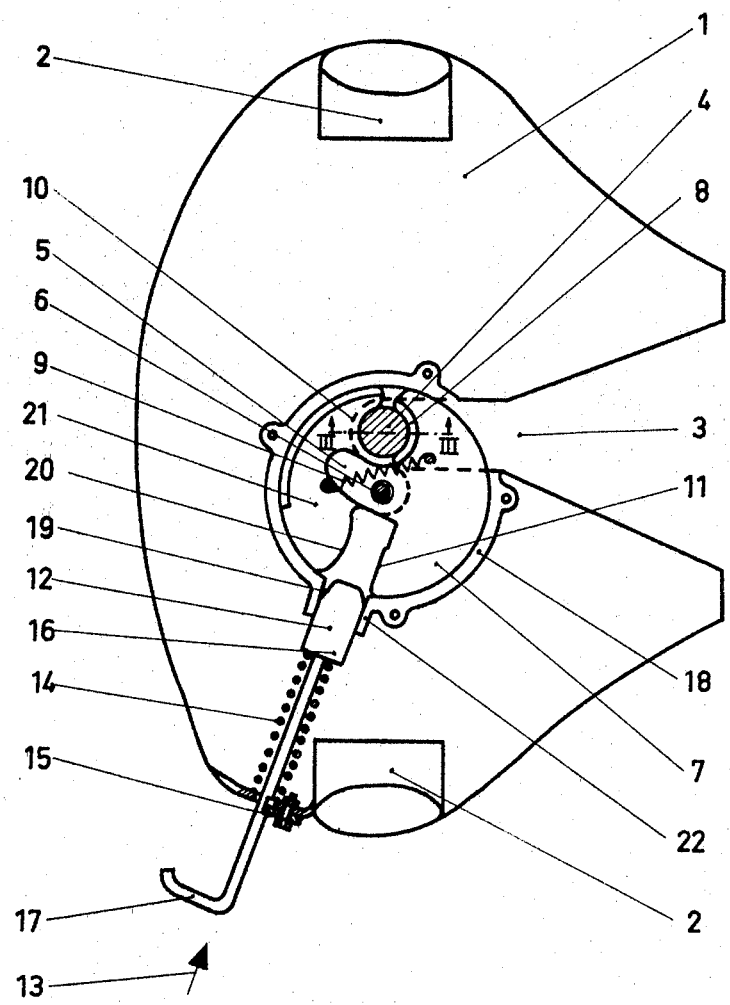
FIGURE 2 is a view similar to FIGURE 1 showing the device in coupled condition prior to unlatching the locking mechanism.
Figure 4:
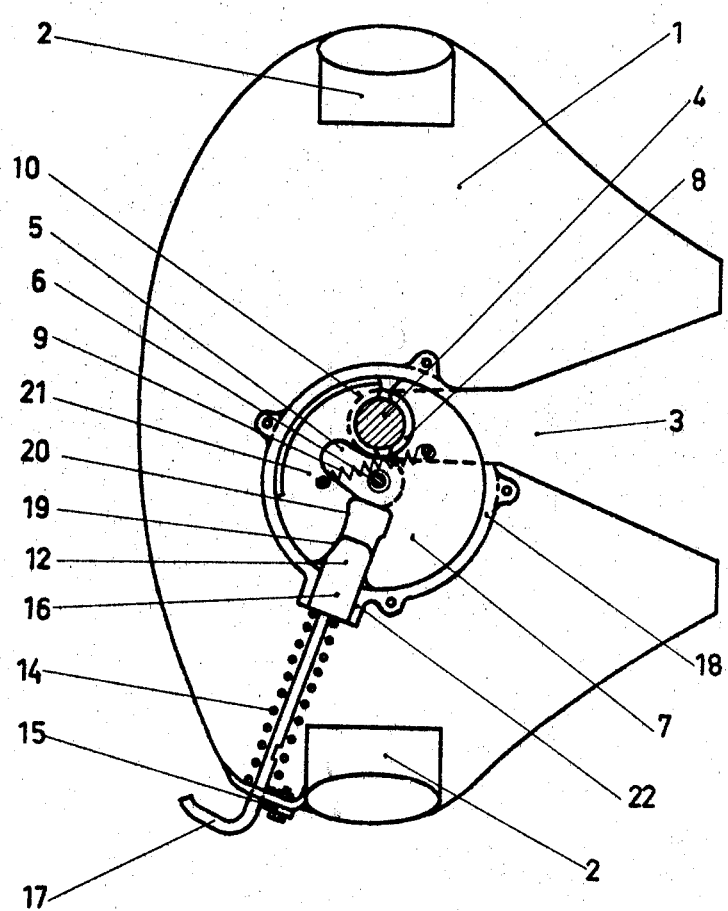
FIGURE 4 is a view similar to FIGURE 2 except for showing the adjustable safety lock cocked in position.

Within the housing 18 a pair of claws 7, 21 is rotatably mounted about a concentrically disposed pin 6. The pair of claws consists of the front claw 21 and the back claw 7. Both claws are generally semicircular and irregularly shaped and provided with a half collar 8, 10 and each thereof is adapted for mating with the other collar and for engaging the pin 4. The claw 21 is located forward of the normal position of the kingpin 4 while the claw 7 is located rearward of the pin 4. Referring to FIGURE 3, it will be noted that the collar 8 is turned downwardly while the collar 10 is turned in the opposite direction. The collar 8 is contiguous to a narrow arm 5 of claw 7. The circumference of each claw is flanged coaxial to the housing to provide a large surface area which abuts the inside wall of the housing 18. From FIGURES 2 and 4 it can be readily seen that the claws, when in engaging position, provide a radially extending slot therebetween of predetermined curvature 11, 20 into which is received an element 16 of the locking mechanism 12.

The locking mechanism 12, parts of which protrude in operation through a suitably flanged opening 22 in housing 18, is composed of a handle 17 at the end of which is secured a wedge 16 having a tapered front face 19 located opposite to the curved face 20 of claw 21. Interposed between wedge 16 and an abutment 15 is a tension spring 14 which urges the wedge to move in the direction of the housing. The handle 17 is slightly notched and when the notched portion is brought to bear against the abutment 15, the combination works as a detent or latch for preventing the movement of the handle.

Figure 1:
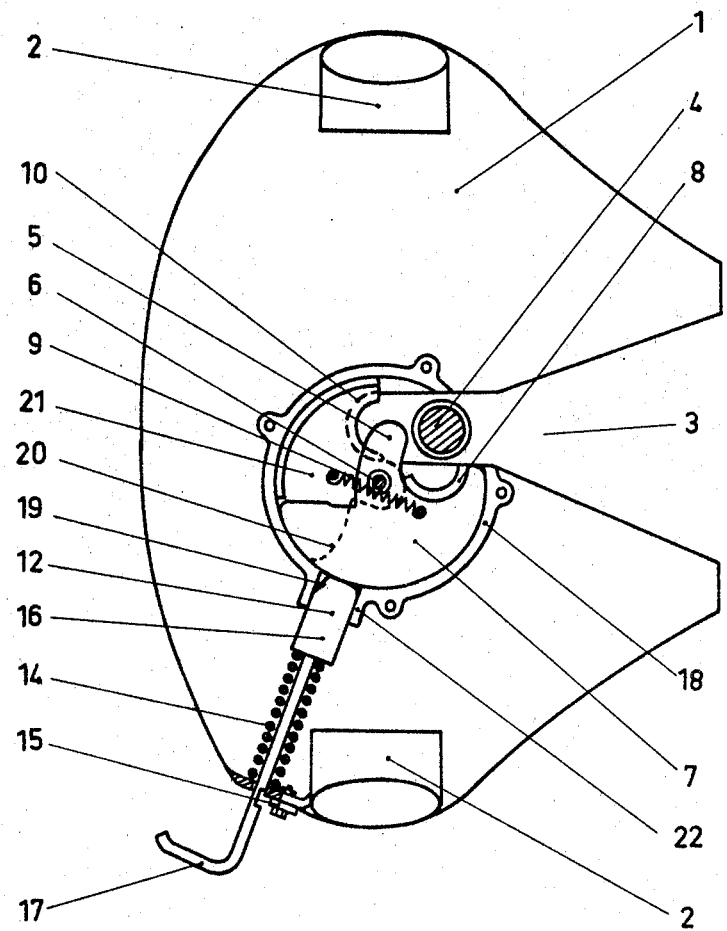
FIGURE 1 is a bottom view of the lower plate fifth wheel coupling in accordance with this invention, with the coupling cover removed, illustrating the position of the parts prior to engagement with the kingpin of the semitrailer which is not shown.

Although the claws may float about pin 6 they are maintained in a predetermined position by a spring 9 which connects these two members. In this position, see FIGURE 1, the coupling is ready to receive the kingpin 4 upon a normally rearward movement of the tractor. Moving through the slot 3 the pin 4 engages arm 5 of claw 7 and swings the same forward about pin 6 whereby the collar 8 is caused to grip the kingpin 4 from behind until the collar 10 starts to close the circumference around the kingpin 4. The tension spring 9, anchored between claws 7, 21, is elongated by this movement and caused to move across its dead center, i.e. pin 6, thereby functioning as a snap spring which facilitates the above movement. At this point the face 11 of the claw 7 moves past the end face of wedge 16 permitting the locking mechanism to be actuated in the direction of arrow 13, under the pressure of spring 14, by a small transverse movement of handle 17 to release the latter from the detent engagement with abutment 15. The wedge now comes to rest between the suitably curved front face 20 and the rear face 11 of the claws, see FIGURE 4. As a result of the foregoing, vibrations, shock load and impacts due to the normal hazards of travel will not cause any appreciable wear between the abutting surfaces since most of the load is now transmitted only through the kingpin 4, the collar 8 of the claw 7 and housing 18 which is securely and rigidly mounted to plate 1 which then ultimately absorbs the shocks and the load resulting from the trailer. The latter members are the only ones disposed opposite to the direction of travel relative to the location and loading action of the kingpin 4.

The automatic and continuous adjustment to the movement of kingpin 4 occurs without a load upon and between the tapered surface 19 of wedge 16 and the projected surface 20 of the adjustable claw 21. The latter being located forward of the kingpin in the direction of travel and thus not affected by the trailer load.

It will be appreciated that the aforedescribed components may be readily replaced, as a unit, by removing the housing 18 without necessitating a dismantling of the heavy lower fifth wheel plate 1.

For further reducing the wear upon the cooperating components, the wedge may be fabricated of shock absorbing rubber-like elastic material or, preferably, be made of a dual shell with a suitably axially extending inlay of resilient material or of one or more spring members.

What is claimed is:
1. In a coupling arrangement for a tractor-trailer, in combination, a lower fifth wheel plate having a slot for a kingpin to enter; a housing depending from the bottom of said plate and located at least partly underneath said slot; a pair of claws suitably mounted within said housing and rotatably movable therein and arranged for receiving the kingpin between the claws in a manner so that the first claw is located forward and the second claw rearward of the kingpin in the normal direction of travel; said first claw having a curved surface; and means interposed between the curved surface of said first claw and said second claw, said means including a wedge having tapered face engaging said curved surface.
2. In a coupling arrangement according to claim 1, wherein each of said claws includes a semicircular collar, and contiguous to the collar of said second claw an arm having substantially the same radius as either one of said collars.
3. In a coupling arrangement according to claim 2, wherein said collars are axially spaced relative to each other.
4. In a coupling arrangement according to claim 3, wherein said arm partly overlaps said first collar.
5. In a coupling arrangement according to claim 1, wherein said means includes a spring-biased, self-adjusting, locking means.
6. In a coupling arrangement according to claim 1, wherein said claws are coaxially disposed within said housing and the circular circumference thereof abuts the housing wall.
7. In a coupling arrangement according to claim 6, wherein said housing is tubular and detachably secured to said lower plate and includes a flanged opening for receiving the wedge therethrough, and the circumference is slotted axially to permit the kingpin to enter.
8. In a coupling arrangement according to claim 1, and a spring connecting said first and second claw and being arranged to function as a snap spring upon passing dead center.
9. In a coupling arrangement according to claim 1, wherein said wedge is at least partly composed of resilient material.
10. In a coupling arrangement according to claim 1, wherein said wedge is a multishell member and includes an axially extending resilient inlay.
11. In a coupling arrangement according to claim 10, wherein said inlay is formed of rubber-like material.
12. In a coupling arrangement according to claim 11, wherein said inlay includes one or more springs.

References Cited

UNITED STATES PATENTS

| | | | |
|---|---|---|---|
| 2,855,221 | 10/1958 | Cochrane | 280—434 |
| 2,756,074 | 7/1956 | Kayler | 280—437 |

FOREIGN PATENTS 642,699  7/1962  Italy.

U.S. Cl. X.R.

LEO FRIAGLIA, *Primary Examiner.*